US009369215B2

(12) United States Patent
Rudland et al.

(10) Patent No.: US 9,369,215 B2
(45) Date of Patent: Jun. 14, 2016

(54) ASYNCHRONOUS TRANSMISSION WITH DOUBLE WAKE UP

(75) Inventors: Philip Andrew Rudland, Sunderland (GB); Maulin Dahyabhai Patel, Tuckahoe, NY (US); Philip Anthony Jamieson, Dorking (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 230 days.

(21) Appl. No.: 13/496,591

(22) PCT Filed: Sep. 10, 2010

(86) PCT No.: PCT/IB2010/054082
§ 371 (c)(1),
(2), (4) Date: Mar. 16, 2012

(87) PCT Pub. No.: WO2011/033430
PCT Pub. Date: Mar. 24, 2011

(65) Prior Publication Data
US 2012/0171954 A1    Jul. 5, 2012

(30) Foreign Application Priority Data
Sep. 21, 2009    (EP) .................................... 09305874

(51) Int. Cl.
*H04W 52/02*    (2009.01)
*H04B 5/00*    (2006.01)
(Continued)

(52) U.S. Cl.
CPC ......... *H04B 13/005* (2013.01); *H04W 52/0225* (2013.01)

(58) Field of Classification Search
CPC ......... H04W 52/02; H04B 5/00; H04B 13/00; H04Q 7/00; H04Q 7/24; H04L 12/26; G08C 17/00

USPC ....................................................... 455/41.1
See application file for complete search history.

(56) References Cited

U.S. PATENT DOCUMENTS 7,106,814 B2    9/2006   Carsello
7,894,853 B2 *  2/2011   Sugaya ................. H04W 28/06
                                                        455/454

(Continued)

FOREIGN PATENT DOCUMENTS

CN    101389265 A    3/2009
EP    1657852 A1    5/2006

(Continued)

OTHER PUBLICATIONS

Anastasi, G. et al, "Energy Conservation in Wireless Sensor Networks: A Survey", AD HOC Networks, Elsevier, vol. 7, No. 3, May 1, 2009, pp. 537-568.*

(Continued)

*Primary Examiner* — Edward Urban
*Assistant Examiner* — Ralph H Justus
(74) *Attorney, Agent, or Firm* — Larry Liberchuk

(57) ABSTRACT

The present invention relates to an apparatus, method and computer program product for controlling reception in an asynchronous operation mode, wherein a transmitter sends an extended preamble sequence of length longer than the maximum length of a wake up message itself plus the maximum length of a gap between wake up messages, such that a receiver turning on during a sequence of wake up commands and not detecting the wake up commands, can be sure to successfully detect a preamble if it tries again a second time a set interval later.

11 Claims, 3 Drawing Sheets

(51) Int. Cl.
*H04B 13/00* (2006.01)
*H04L 12/26* (2006.01)

(56) References Cited

U.S. PATENT DOCUMENTS

| | | | | |
|---|---|---|---|---|
| 2008/0095126 A1* | 4/2008 | Mahany | ............... | H04W 48/08 370/338 |
| 2009/0003252 A1* | 1/2009 | Salomone | ......... | H04W 52/0229 370/311 |
| 2010/0067393 A1* | 3/2010 | Sakimura | ............ | H04L 12/5695 370/252 |
| 2010/0290379 A1* | 11/2010 | Bahk | ................ | H04W 52/0216 370/311 |

FOREIGN PATENT DOCUMENTS

| EP | 2009940 A1 | 12/2008 |
|---|---|---|
| WO | WO2007132196 A1 | 11/2007 |
| WO | WO2008071762 A1 | 6/2008 |

OTHER PUBLICATIONS

Schurgeres, C., Tsiatsis, V., Srivastava, M.B., "STEM: Topology Management for Energy Efficient Sensor Networks", IEEE Aerospace Conference '02, Big Sky, MT, Mar. 10-15, 2002.*

Schurgeres, C., Tsiatsis, V., Srivastava, M.B., STEM: Topo.ogy Management for Energy Efficient Sensor Networks), IEEE Aerospace Conference '02, Big Sky, MT, Mar. 10-15, 2002.*

Schurgeres, C., Tsiatisis, V., Srivastava, M.B., STEM: Topology Management for Energy Efficient Sensor Networks), IEEE Aerospace Conference '02, Big Sky, MT, Mar. 10-15, 2002.*

Giuseppe Anastasi et al., "Energy Conservation in Wireless Sensor Networks: A Survey", AD HOC Networks, Elsevier, vol. 7, No. 3, Jul. 29. 2008, pp. 537-568.

Steven Corroy et al., "Low Power Medium Access Control for Body-Coupled Communication Networks", Wireless Communication Systems, 2009, ISWCS 2009, 6th Int'l Symposium on IEEE, Piscataway, NY, Sep. 7, 2009, pp. 398-402, XP031545243.

A. El-Hoiydi et al., "Poster Abstract: WiseMAC, an Ultra Low Power MAC Protocol for the WiseNET Wireless Sensor Network", SENSYS '03, Nov. 5-7, 2003, XP002614267.

John A. Stankovic, "Wireless Sensor Networks", Department of Computer Science University of Virginia, Jun. 19, 2006.

Stefan Mahlknecht et al., "CSMA-MPS: A Minimum Preamble Sampling MAC Protocol for Low Power Wireless Sensor Networks", Factory Communication Systems, 2004. Proceedings. 2004 IEEE International Workshop, Sep. 22-24, 2004.

Chaoguang Men et al., "A MAC Protocol with Little Idle Listening for Wireless Sensor Networks", Computer Science, Lecture Notes in Computer Science, Emerging Directions in Embedded and Ubiquitous Computing, Springer Berlin, pp. 115-123, Nov. 27, 2007.

Wei Ye et al., "An Energy-Efficient MAC Protocol for Wireless Sensor Networks", USC/ISI Technical report ISI-TR-543, Sep. 2001.

Joseph Polastre et al., "Versatile Low Power Media Access for Wireless Sensor Networks", SenSys'04, Nov. 3-5, 2004, Baltimore, Maryland, USA.

David Moss et al., "Low Power Listening", TinyOS TEP (2008) vol. 13, Issue: 4, pp. 1-6.

Michael Buettner et al., 'X-MAC: A Short Preamble MAC Protocol for Duty-Cycled Wireless Sensor Networks, Department of Computer Science University of Colorado at Boulder, Technical Report CU-CS-1008-06 May 2006.

Javier Bonny, "Investigating MAC Power Consumption in Wireless Sensor Network", IC-29-LCA—Feb. 9, 2005.

* cited by examiner

ASYNCHRONOUS TRANSMISSION WITH DOUBLE WAKE UP

FIELD OF THE INVENTION

The present invention relates to a system, apparatus, method, and computer program product for controlling asynchronous transmission of communication signals, such as—but not limited to—body-coupled communication signals.

BACKGROUND OF THE INVENTION

Body-coupled communications (BCC) or body-based communication has been proposed as a promising alternative to radio frequency (RF) communication as a basis for body area networks (BANs) as standardized by the 802.15.6 Task Group of the Institute of Electrical and Electronics Engineers (IEEE). BCC allows exchange of information between a plurality of devices which are at or in close proximity of a body of a human or an animal. This can be achieved by capacitive or galvanic coupling of low-energy electric fields onto the body surface. Signals are conveyed over the body instead of through the air. As such, the communication is confined to an area close to the body in contrast to RF communications, where a much larger area is covered. Therefore, communication is possible between devices situated on, connected to, or placed close to the body. Moreover, since lower frequencies can be applied then is typical in RF-based low range communications, it opens the door to low-cost and low-power implementations of BANs or personal area networks (PANs). Hence, the human body is exploited as a communication channel, so that communication can take place with much lower power consumption than in standard radio systems commonly used for BANs (e.g. ZigBee or Bluetooth systems). Since BCC is usually applied in close proximity to the body, it can be used to realize new and intuitive body-device interfaces based on contact or proximity. This creates possibilities for many applications in the field of identification and security.

BCC can be technically realized by electric fields that are generated by a small body-worn tag, e.g., being integrated to a credit card or another suitable device attached to or worn in close proximity to the body. This tag capacitively or galvanically couples a low-power signal to the body. Sometimes this body-coupled communication is referred to as "near-field intra-body communication". BCC is a wireless technology that allows electronic devices on and near the human body to exchange digital information through capacitive or galvanic coupling via the human body itself. Information is transmitted by modulating electric fields and either capacitively or galvanically coupling tiny currents onto the body. The body conducts the tiny signal to body mounted receivers. The environment (the air and/or earth ground) provides a return path for the transmitted signal.

FIG. 1 shows an exemplary body communication system structure, where data signals are transmitted via couplers placed near or on the body. These couplers transfer the data signal, either galvanically or capacitively, to the body. In the example of FIG. 1, one coupler or electrode provides ground potential GND and the other coupler or electrode is used for transmitting/receiving a signal S. More specifically, transmission from a transmitter (TX) 100 to a receiver (RX) 200 over a human arm is depicted. Generally, every node can in principle act both as transmitter and receiver, i.e., as a transceiver (TRX), and communication can take place from everywhere on the body.

A communication protocol, such as the Medium Access Control (MAC) protocol, coordinates transmission-related actions over shared channels and may comprise a synchronous mode, supporting priority driven bandwidth allocations, and an asynchronous mode. The asynchronous mode is intended primarily to support ultra low power operation. In this mode the devices spend most of their time sleeping, potentially resulting in long operational life even from a small form factor battery. Devices periodically listen to the medium according to their wake up schedule.

A. El-Hoiydi et al, "WiseMAC, an Ultra Low Power MAC Protocol for the WiseNET Wireless Sensor Network", SenSys '03, November 5-7, 1003, Los Angeles, Calif., USA, describes preamble sampling for the receiver side, which consists in regularly sampling the medium to check for activity. In this context, sampling the medium is intended to mean listening to the radio channel for a short duration, e.g. the duration of a modulation symbol. In a network, all nodes sample the medium with the same constant period, independently of the actual traffic. Their relative sampling schedule offsets are independent. If the medium is found busy, the receiver continues to listen until a data packet is received or until the medium becomes idle again. At the transmitter, an extended period of preamble is transmitted in front of every message to ensure that the receiver will be awake when the data portion of the message will arrive. The preamble introduces a power consumption overhead both in transmission and in reception. To minimize this overhead, sensor nodes learn the offset between the sampling schedule of their direct neighbors and their own one. Knowing the sampling schedule of the destination, sensor nodes send messages at just the right time with a preamble of minimized length.

However, in a low power, low duty cycle network it is typical that most devices spend the vast majority of their time receiving, and only transmit occasionally. The receiver has to listen often enough to be sure to hear the preamble if it is transmitted. Reducing the reception idle listening time is critical for battery life.

SUMMARY OF THE INVENTION

An object of the present invention is to provide an improved transmission system that is particularly power efficient for receiving devices in asynchronous operation modes.

This object is achieved by an apparatus as claimed in claims 1 and 7, a method as claimed in claim 10, a computer program product as claimed in claim 11, and a system as claimed in claim 13.

Accordingly, a transmitter can send a near constant sequence of information (e.g. a sequence of wake up packets (WUPs)), each information being preceded by the predetermined information (e.g. a preamble). The information does not necessarily have to be wake-up specific. For unicast data it might be easier just to transmit data packets repeatedly. WUP packets are often good though, and have the advantage that they can be small as they contain no application data. A receiver can now check, for only an extremely short time, for the predetermined information and in case the predetermined information is detected, the receiver stays on and listens for the entire wake up information. Otherwise, in case the predetermined information is not detected, the receiver repeats the check a short moment later, so as to detect the preamble in case the first check was performed during the wake up information period or during a gap (e.g. listening slot) between two wake up messages.

Hence, an exceptionally low power consumption can be achieved by creating a mechanism that allows the receiver or receiving node to use the minimum possible "receiver on" time to check whether or not another node is trying to wake it up. To achieve this, the transmitter or transmitting node may transmit a near constant sequence of wake up messages. In fact, in order to allow the receiver to acknowledge that it is awake, the wake up messages could have small delays between them. It is much faster to check for the presence or absence of the predetermined information (e.g. preamble or synchronisation sequence at the start of a message) than it is to wait long enough for a whole message to be received. The transmitter may send the predetermined information as an extended preamble sequence of length longer than the maximum length of wake up information itself plus the maximum length of the gap between wake up messages, such that a receiver turning on during a sequence of wake up commands and not detecting the wake up commands, can be sure to successfully detect a preamble if it tries again a second time after the second predetermined time period. This approach can thus be considered as "double wake up" within one cycle of a wake up schedule.

It turns out that waking up twice to check quickly for preamble is substantially more efficient than waking up once and listening for the duration of an entire message.

According to a first aspect, the third predetermined time period (i.e. second wake up period of double wake up) has substantially the same length as the first predetermined time period. This measure provides the advantage that in case no wake up messages are being transmitted, the receive power is just that required for two wake up checks, averaged over the intermediate sleep period.

According to a second aspect which may be combined with the first aspect, at least one timer may be provided for counting at least one of the first to third predetermined time periods. By providing a timer or timer functionality, the predetermined time periods can be set and modified easily so as to keep the system flexible.

According to a third aspect which can be combined with any one of the first and second aspects, the detector may be adapted to detect an information transmitted after the predetermined information with indicating a receiver for which the data transmission is intended. Thereby, selective transmission can be implemented and reception of the related payload portion can be suppressed if it is not intended for the receiver. It is noted that the proposed solution can also be used with data being sent directly, and no specific wake up information as such following the predetermined information (e.g. preamble).

According to a fourth aspect which can be combined with any one of the first to third aspects, the length of the second predetermined time period is substantially the same as the length of the wake up information. This provides the advantage that if the receiver does detect the preamble then it can send its "ready" message with less delay than if a longer preamble were used.

According to a fifth aspect which can be combined with any one of the first to fourth aspects, the detector may be adapted to detect the received signal by checking the level of received energy. Thereby, energy consumption at the receiver can be further reduced by initiating the double wake up procedure only when the receiver actually receives a signal. Even if more than one energy level check is necessary, as the first energy check might have occurred at the very moment of the gap between two wake up frames, each check can be aborted even more quickly than normal if there is no energy on the channel. The preamble check takes a small number of physical layer symbols (maybe 2 to 4) before the preamble can be detected reliably.

It is noted that the apparatus may be provided in a receiver or transceiver for any kind of data packets and may be implemented as a discrete hardware circuitry with discrete hardware components, as an integrated chip, as an arrangement of chip modules, or as a signal processing device or chip controlled by a software routine or program stored in a memory, written on a computer readable medium, or downloaded from a network, such as the Internet.

Further advantageous embodiments are defined below.

BRIEF DESCRIPTION OF THE DRAWINGS

The invention will now be described, by way of example, based on embodiments with reference to the accompanying drawings, wherein.

DESCRIPTION OF PREFERRED EMBODIMENTS

Various embodiments of the present invention will now be described based on a transmitter and receiver processing for asynchronous transmission in BANs. It is however noted that the details described below in connection with the embodiments can be applied to both on-body communications and in-body communications. Of course, the present invention can also be applied to other types of communications not related to the initially mentioned specific applications.

Figure 1:
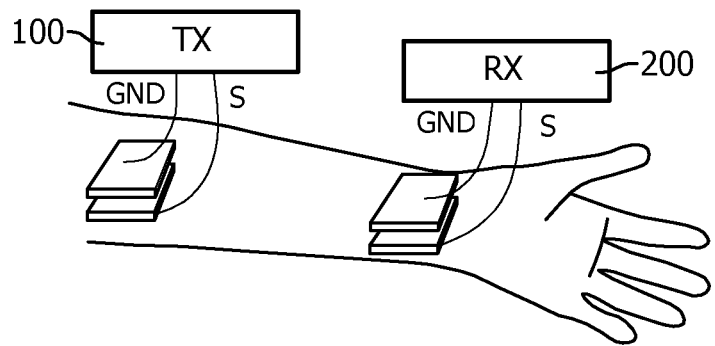
FIG. 1 shows a schematic electrode arrangement of a BCC system.

According to the following embodiments, low receiver power consumption can be achieved by minimizing "receiver on" times required to check whether or not another node is trying to wake a receiver up. This can be achieved by having the transmitting node (e.g. transmitter 100 in FIG. 1) transmit a near constant sequence of wake up messages (e.g. WUPs). In fact, in order to allow the receiving node (e.g. receiver 200) to acknowledge that it is awake, the wake up messages have to have small delays between them. It has been found that it is much faster to check for the presence or absence of the preamble (i.e. the synchronisation sequence at the start of a message) than it is to wait long enough for a whole wake up message to be received. In the embodiments, the transmitting node sends an extended preamble sequence of length longer than the maximum length of the wake up message content plus the maximum length of the gap between wake up messages, such that a receiver turning on during a sequence of wake up messages or commands and not detecting the wake up commands, can be sure to successfully detect a preamble if it tries again a second time a set interval later.

Figure 2:
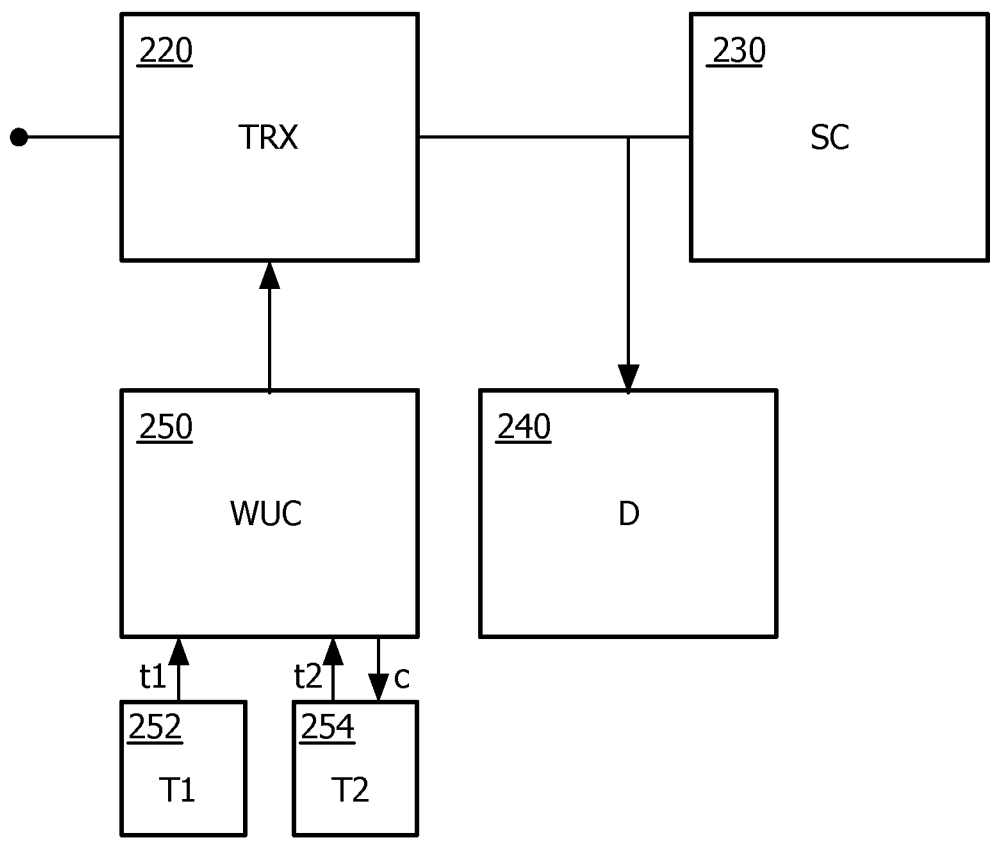
FIG. 2 shows a schematic block diagram of a receiver according to a first embodiment.

FIG. 2 shows a schematic block diagram of receiver processing blocks used for the proposed wake up control procedure. It is noted that other parts or blocks not related to the present inventions have been omitted for reasons of brevity.

Communication signals or data are transmitted to or received from a BAN via a transceiver (TRX) 220 to which a signaling control function or circuit (SC) 230 is connected for processing and generating communication signals or data in accordance with relevant communications protocol(s). Furthermore, a detector function or circuit (D) 240 is provided for checking the output of the TRX 220 as to the receipt of any predetermined information which indicates reception of a wake up message. In the present embodiment, this predetermined information comprises a predefined preamble sequence which can be detected by any matching or correlation process. The detection result of the detector circuit 240 is supplied to or can be accessed by a wake up processor, control circuit or controller (WUC) 250 responsible for controlling wake up operation of the TRX 220 e.g. for power saving purposes. The wake up controller may be implemented as a central processing unit controlled by software routines stored in a memory (not shown). The detector circuit 240 may be provided as a separate entity or may be an integrated functionality of the wake up controller 250.

The wake up controller 250 switches at least a receiver part of the TRX 220 between an active state (wake state) and an inactive state (sleep state) in response to a wake up schedule and a detection result obtained from said detector circuit 240. Additionally, the wake up controller 250 may be provided with timing signals t1 and t2 generated by respective first and second timer functions or circuits (T1, T2) 252, 254, wherein a first timing signal t1 defines a short wake up period used for checking whether a predetermined preamble sequence is being received and a second timing signal t2 defines a preset sleep period directly following the short wake up period so as to minimize power consumption of the TRX 220. The timer circuits 252, 254 may be controllable so as to change wake up and sleep periods and/or may be arranged as a single timer circuit which provides the required counting functions. Moreover, they may be implemented as software routines used for controlling operation of the wake up controller 250.

In the first embodiment, the wake up controller 250 controls the start of the second timer circuit 254 by a control signal c.

In the following, a double wake up control by the wake up controller 250 is described in more detail.

A transmitter of the concerned BAN transmitter sends a near constant sequence of wake up messages (e.g. WUPs), each wake up messages being preceded by a preamble. Based on the wake up schedule, the wake up controller 250 activates the receiver or receiving operation of the TRX 220 and triggers a timer operation of the first timer circuit 252. Thus, the detector circuit 240 checks, for the short time period counted by the first timer 252, for a preamble in the received signal. In case the detector 240 indicates that a preamble has been detected, the wake up controller 250 controls the receiver of the TRX 220 to stay on so as to listen for the entire wake up message.

Otherwise, if the detector circuit 240 does not detect any preamble in the received signal, the wake up processor 250 deactivates the receiver of the TRX 220 and controls the second timer circuit 254 by the control signal c to start counting the intermediate sleep period directly after the end of the initial time period counted by the first timer circuit 252 and signaled by the first timing signal t1. Directly after the end of the intermediate sleep period (as signaled by the second timing signal t2), the wake up controller 250 re-activates the receivers and initiates a third timer operation (e.g. again by the first timer circuit 252 or an additional third timer circuit (not shown)) to repeat the preamble check a short moment later, so as to detect the preamble in case the first check was performed during the wake up message payload or during a listening slot between two wake up messages.

The transmission schedule of the transmitter (e.g. transmitter 100 of FIG. 1) can be set so that the length of the preamble is the same as the maximum length of the wake up message plus the maximum length of any intermediate gap (e.g. listening slot).

When there are no wake up messages being transmitted the receive power is thus reduced to that required for the above double wake up check, averaged over the intermediate sleep period.

Of course, if a preamble is detected by the detector circuit 240 then the receiver of the TRX 220 is kept activated until the wake up message has been received. Yet, this typically happens for only a small percentage of cases in a low duty cycle network, not least due to the MAC protocol having mechanisms to track the wake up cycles of other nodes.

It should be noted that further power savings are possible by having the detector circuit 240 check for the presence or absence of radio frequency energy on the reception channel. This could be done even more quickly than listening for the preamble, and may thus lead to a further reduction of power consumption. I.e., if there is no energy on the channel then the wake up controller 250 does not need to initiate any wake up procedure, no-one is transmitting. Nevertheless, the wake up controller may still have to perform the "double wake up" control in case the first wake up period falls into the gap between two wake up commands, during which for a short period there is no energy on the channel.

Figure 3:
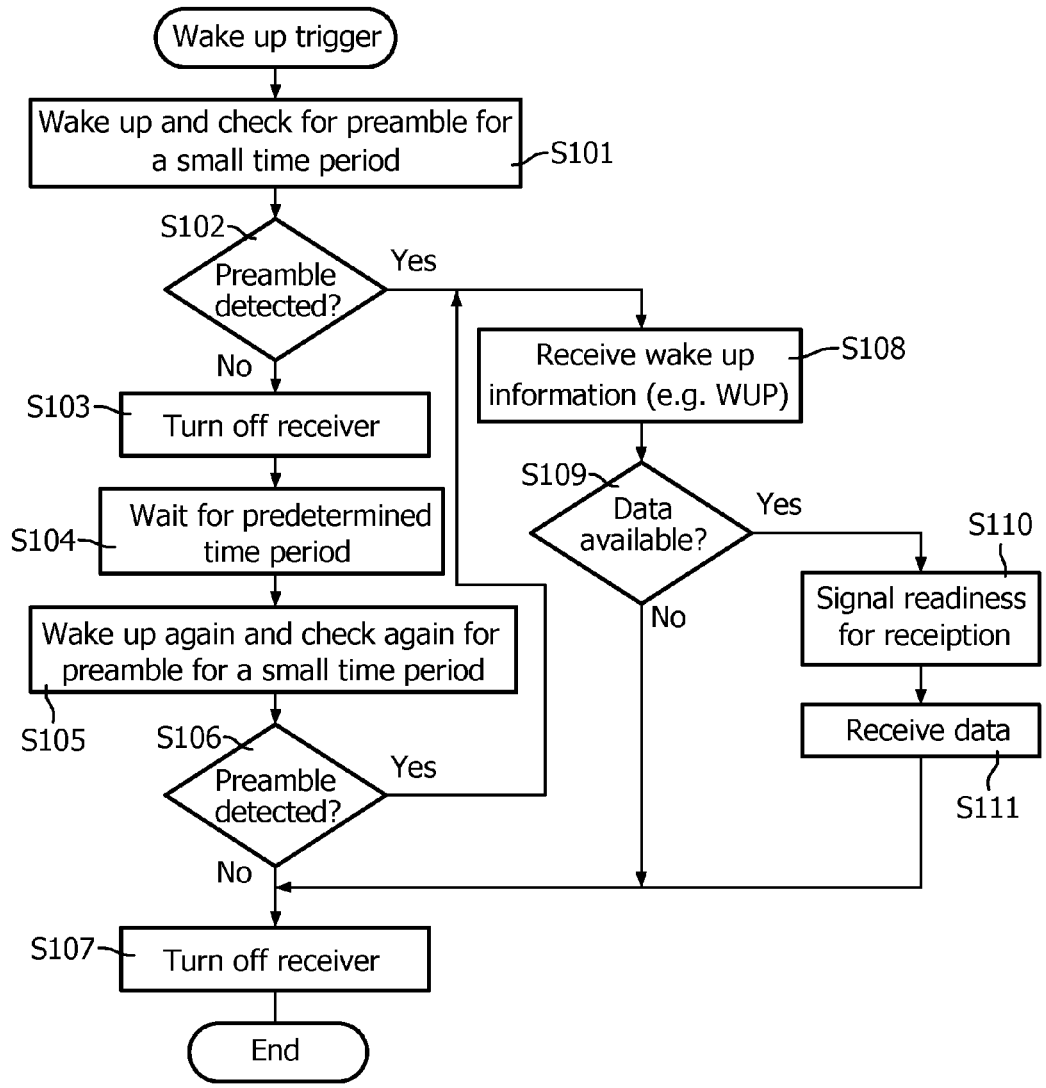
FIG. 3 shows a schematic flow diagram of a wake up control processing according to a second embodiment.

FIG. 3 shows a schematic flow diagram of a wake up control procedure according to a second embodiment. This procedure may be implemented in the wake up controller 250 of FIG. 2.

The procedure of FIG. 3 is initiated or triggered by a wake up trigger which may be generated during every cycle of a wake up schedule.

In step S101 the receiver is activated or woken up and a check for the preamble of a wake up message or command is performed for a small time period sufficient to detect the preamble. In step S102 it is checked whether a preamble has been detected during the small checking period.

If it is determined in step S102 that a preamble has not been detected, the procedure continues with step S103 and the receiver is turned off. Then, in step S104, an intermediate waiting period is introduced with a predetermined length to ensure that a preamble, if transmitted, will be received after this waiting period. Accordingly, in the subsequent step S105, the receiver is reactivated or woken up again for a small time period to check for the preamble a second time. In step S106 it is checked whether the preamble has now been detected. If the preamble has again not been detected, the receiver is turned off in step S107 and the procedure ends here. At the next cycle of the wake up schedule, the procedure may be initiated again with a wake up trigger.

If it is determined in steps S102 or S106 that a preamble has been detected in the first or second small wake up period, the procedure branches to step S108 and the receiver is kept activated to receive the subsequently transmitted wake up information (e.g. WUP). Then, it is checked in step S109 whether the announced data transmission is intended for this receiver and data is thus available to be processed in this node. If not, the procedure branches to step S107 where the receiver is turned off.

If it is determined in step S109 that the announced data transmission is intended for this receiver, the procedure continues with step S110 and readiness for reception is signaled to the transmitter which announced the data transmission. Then, in step S111 a data reception process is initiated. Finally, the procedure branches to step S107 and the receiver is turned off.

Figure 4A:
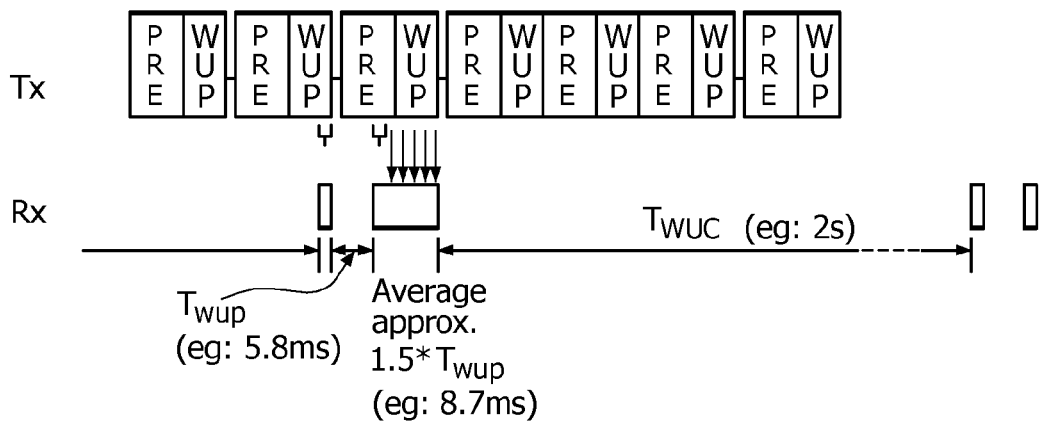
FIGS. 4A to 4C show exemplary diagrams indicating power usage and transmission between a transmitter and a receiver according to the embodiments.
Figure 4B:
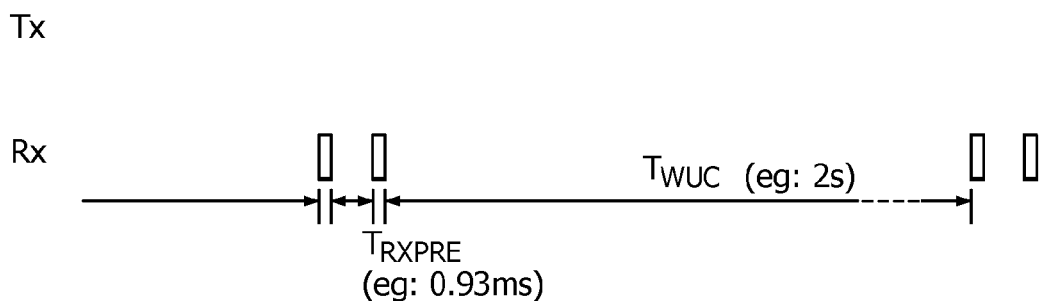
Figure 4C:
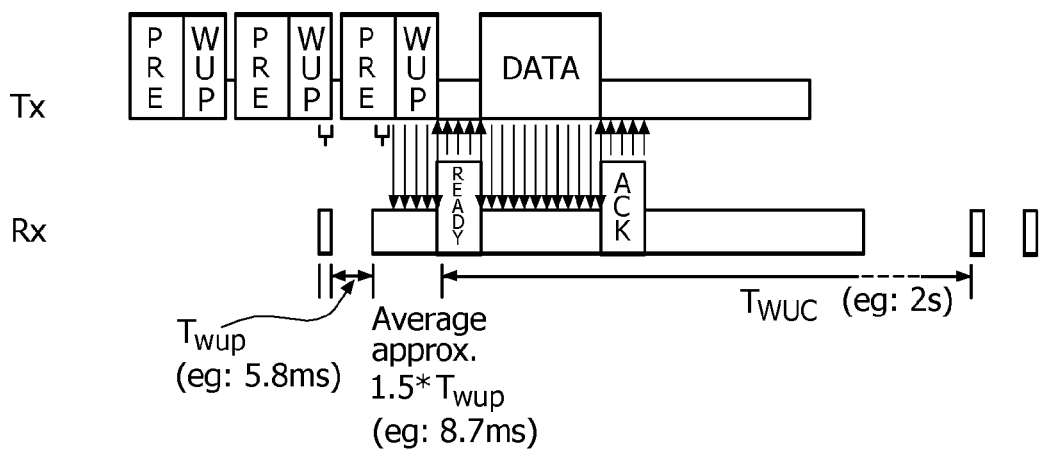

FIGS. 4A to 4C show exemplary diagrams indicating power usage and transmission between a transmitter (Tx) and a receiver (Rx) according to the above embodiments in different scenarios. The upper part of these figures show the signal sequence received from the transmitter and the bars of the lower part of the figures indicate wake state periods at the receiver. Downward arrows indicate data reception by the receiver and upward arrows indicate data transmission from the receiver to the transmitter.

In these examples, the two short wake up periods $T_{RXPRE}$ have been set to only 0.93 ms and the intermediate sleep period has been set to approximately the length $T_{WUP}$=5.8 ms of the WUP, which corresponds to the specifications of the physical layer (PHY) according to figures for a typical low power radio technology. Assuming a wake up cycle $T_{WUC}$=2 s, this leads to an idle reception power ratio of only 0.09%. Of course, other lengths can be used as well and the embodiments are in no way restricted to these figures.

The diagram of FIG. 4A relates to a scenario where the announced data transmission was not intended for the receiver of the present embodiment but for some other node and consequently no data reception is initiated. When the first short wake up period is activated at the receiver, the transmitter is transmitting a WUP, so that no preamble is detected. Thus, the receiver is set into the intermediate sleep state for the time period $T_{WUP}$ and then the second wake up period is started. Due to the fact that the intermediate sleep period corresponds to the WUP length, the second wake up period will coincide with a preamble transmission period. Consequently, the brief check for the preamble turns out positive and WUP reception will be directly activated and will continue until the whole WUP has been received (due to the presence of a length field early in the frame). Accordingly the mean average time for which the receiver is turned on during this second wake up in this scenario is 1.5 times $T_{WUP}$ in total. The best case is that it wakes up just in time and stays on for $T_{WUP}$, and the worst case is it turns on right at the start of the preamble, and has to stay on for $2*T_{WUP}$. The average of $T_{WUP}$ and $2*T_{WUP}$ is $1.5*T_{WUP}$. As it is now detected that the announced data transmission is not intended for this receiver or node, the receiver is deactivated and the procedure starts again with the start of the next wake up cycle after $T_{WUC}$.

The diagram of FIG. 4B relates to a scenario where no data transmission is in progress or pending and the transmitter is silent. Consequently, when the first short wake up period is activated at the receiver, no preamble is detected. Thus, the receiver is set into the intermediate sleep state for the time period $T_{WUP}$ and then the second wake up period is started. Again, no preamble can be detected and the receiver is deactivated after the second short wake up period $T_{RXPRE}$ and until the next scheduled wake up procedure. Consequently, the total wake up period amount to only 2 times $T_{RXPRE}$. It is assumed that this scenario is by far the most common case for an ultra low power device.

The diagram of FIG. 4C relates to a scenario where the announced data transmission was intended for the receiver of the embodiment and consequently data reception is to be initiated. When the first short wake up period is activated at the receiver, the transmitter is again transmitting a WUP, so that no preamble is detected. Thus, the receiver is set into the intermediate sleep state for the time period $T_{WUP}$ and then the second wake up period is started. Due to the fact that the intermediate sleep period corresponds to the WUP length, the second wake up period will coincide with a preamble transmission period and a preamble can thus be detected. Consequently, WUP reception will be activated again until the whole WUP has been received. As it is now detected that the announced data transmission is intended for this receiver or node, the transceiver is kept activated and readiness for reception is signaled by the receiver towards the transmitter, e.g. with a READY message. In response thereto, the transmitter transmits the available data and after complete reception, the receiver responds with an acknowledgement (ACK) if data has been correctly received. The receiver is kept active until there is no more data to follow. Then, the receiver is deactivated again and the wake up procedure starts again with the start of the next wake up cycle after $T_{WUP}$.

It is however noted that the above wake up processing and controller can be applied in any transmission system where receiver devices are operated in an asynchronous operation modes with wake up control function. Furthermore, in the above embodiments, data may be sent directly without any preceding wake up information as such. Then, the question of whether a detected wake up signal is directed to the concerned receiver could be determined based on the data itself. Specific implementations of the above embodiments are communication in BANs and between medical implants and external equipment, including for example sports performance monitoring, vital signs monitoring, disease monitoring, or in/on body sensor/drug delivery systems.

In summary, the present invention relates to an apparatus, method and computer program product for controlling reception in an asynchronous operation mode, wherein a transmitter sends an extended preamble sequence of length longer than the maximum length of a wake up message itself plus the maximum length of a gap between wake up messages, such that a receiver turning on during a sequence of wake up commands and not detecting the wake up commands, can be sure to successfully detect a preamble if it tries again a second time a set interval later.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill at least the functions of the wake up procedure, e.g. as described in connection with FIG. 3, based on corresponding software routines. The computer program may be stored/distributed on a suitable medium such as an optical storage medium or a solid-state medium supplied together with or as a part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. An apparatus for signal detection during periodically occurring wake up cycles, the apparatus comprising:
   a wake up controller configured to activate a receiver once or twice during each of the periodically occurring wake up cycles, the receiver being activated for a first predetermined time period during each of the periodically occurring wake up cycles; and
   a detector configured to detect whether a predetermined information is comprised in a signal received by said receiver during said first predetermined time period, said predetermined information being used to announce a data transmission in a sequence of data packets in which a data packet is preceded by said predetermined information and followed by a transmission gap between the data packet and the predetermined information preceding a subsequent data packet, the predetermined information covering a time span that is greater than a maximum time span covered by the data packet and the transmission gap following the data packet;

wherein said wake up controller is further configured to keep the receiver activated if said predetermined information is detected by said detector during said first predetermined time period, otherwise said wake up controller is further configured to deactivate said receiver for a second predetermined time period directly following said first predetermined time period and to reactivate said receiver for a third predetermined time period directly following said second predetermined time period within said each periodically occurring wake up cycle; and wherein said second predetermined time period is selected to ensure that said predetermined information falls into said third predetermined time period in case the receiver receives a data packet in the sequence of data packets and the detector has not detected the predetermined information in said first predetermined time period.

2. The apparatus according to claim 1, wherein said third predetermined time period has substantially the same length as said first predetermined time period.

3. The apparatus according to claim 1, further comprising at least one timer for counting at least one of said first to third predetermined time periods.

4. The apparatus according to claim 1, wherein said detector is configured to detect wake up information in a data packet following said predetermined information, the wake up information indicating a receiver for which said data transmission is intended.

5. The apparatus according to claim 4, wherein the length of said second predetermined time period is substantially the same as the length of a time span covered by the data packet comprising said wake up information.

6. The apparatus according to claim 1, wherein said detector is adapted to detect said received signal by checking the level of received energy.

7. The apparatus according to claim 1, wherein said predetermined information comprises a preamble sequence.

8. An apparatus for transmitting a predetermined information to announce data transmission to receivers operated in an asynchronous reception mode, said apparatus being configured to transmit a sequence of data packets in which the data packets comprise a wake up information that indicates a receiver for which the data transmission is intended, wherein a data packet in the sequence is preceded by said predetermined information and followed by a transmission gap between the data packet and the predetermined information preceding a subsequent data packet, the predetermined information covering a time span that is greater than a maximum time span covered by the data packet and the transmission gap following the data packet;

wherein the receiver is once or twice activated during each of periodically occurring wake up cycles, the receiver being activated for a first predetermined time period during each of the periodically occurring wake up cycles;

wherein the receiver is kept activated if said predetermined information is detected by said receiver during said first predetermined time period, otherwise the receiver is deactivated for a second predetermined time period directly following said first predetermined time period and said receiver is activated for a third predetermined time period directly following said second predetermined time period within said each periodically occurring wake up cycle.

9. The apparatus according to claim 8, wherein said predetermined information comprises a preamble sequence.

10. A method for signal detection during periodically occurring wake up cycles, the method comprising:

once or twice activating a receiving operation during each of the periodically occurring wake up cycles, with first activating a receiving operation for a first predetermined time period during each of the periodically occurring wake up cycles;

detecting a predetermined information comprised in a signal received by said receiving operation during said first predetermined time period, said predetermined information being used to announce a data transmission in a sequence of data packets in which a data packet in the sequence is preceded by said predetermined information and followed by a transmission gap between the data packet and the predetermined information preceding a subsequent data packet, the predetermined information covering a time span that is greater than a maximum time span covered by the data packet and the transmission gap following the data packet;

keeping the receiving operation activated if said predetermined information is detected during said first predetermined time period, otherwise deactivating said receiving operation for a second predetermined time period directly following said first predetermined time period and reactivating said receiving operation for a third predetermined time period directly following said second predetermined time period within said each periodically occurring wake up cycle; and selecting said second predetermined time period so as to ensure that said predetermined information falls into said third predetermined time period in case the receiving operation receives a data packet in the sequence of data packets and the predetermined information has not been detected in said first predetermined time period.

11. A non-transitory computer readable medium comprising executable code adapted to perform the method of claim 10 when run on a computing device.

* * * * *